United States Patent [19]

Stoffel

[11] Patent Number: 4,583,126
[45] Date of Patent: Apr. 15, 1986

[54] RASTER INPUT/OUTPUT SCANNER

[75] Inventor: James C. Stoffel, Rochester, N.Y.

[73] Assignee: Xerox Corporation, Stamford, Conn.

[21] Appl. No.: 639,549

[22] Filed: Aug. 10, 1984

Related U.S. Application Data

[62] Division of Ser. No. 442,555, Nov. 18, 1982, Pat. No. 4,496,984.

[51] Int. Cl.$^4$ ............................................ H04M 1/024
[52] U.S. Cl. .................... 358/294; 358/293; 358/213; 358/285; 250/578; 350/167
[58] Field of Search ............... 358/293, 213, 250, 294, 358/285; 250/234, 578; 350/167

[56] References Cited

U.S. PATENT DOCUMENTS

| | | | |
|---|---|---|---|
| 3,551,683 | 12/1970 | Tothill | 250/221 |
| 3,962,681 | 6/1976 | Requa et al. | 340/146.3 H |
| 4,258,396 | 3/1981 | Scott | 358/293 |
| 4,314,282 | 2/1982 | Fischbeck et al. | 358/286 |
| 4,425,501 | 1/1984 | Stanffer | 250/578 |
| 4,430,564 | 2/1984 | Fischer | 250/578 |
| 4,432,022 | 2/1984 | Tokumitsu | 358/293 |
| 4,467,195 | 8/1984 | Kawamura et al. | 250/578 |
| 4,498,767 | 2/1985 | McGovern et al. | 250/578 |

Primary Examiner—Edward L. Coles, Sr.
Attorney, Agent, or Firm—Frederick E. McMullen

[57] ABSTRACT

A combined raster input and output scanner employing spaced document reading and copy printing arrays at a common read/write station. The document to be read and the copy to be printed are disposed in back to back relation and fed simultaneously to the read/write station between the document reading and copy printing arrays. The image reading array is a monolithic full line chip having dual staggered rows of image sensors with individual lenslets for focusing each sensor onto a scan line at the read/write station. To reduce cost, a minimum number of image sensors with relatively wide spacing therebetween is used. To offset loss of resolution, the reading array is movable between a first reading position where one-half of the document line is scanned and a second reading position where the remainder of the line is scanned. The copy printing array comprises a full line of ink jet nozzles, the number and disposition of the ink jet nozzles corresponding to the image sensors, the copy printing array being similarly movable between first and second copy printing positions concurrently with the reading array to thereby print the line in similar half-line increments.

3 Claims, 6 Drawing Figures

RASTER INPUT/OUTPUT SCANNER

This is a division, of application Ser. No. 442,555, filed Nov. 18, 1982, now U.S. Pat. No. 4,496,984.

The invention relates to a combination raster input and raster output scanner, and more particularly to an improved scanner incorporating a monolithic image read bar combined with a unitary print bar to permit substantially simultaneous reading and writing of a document original and copy thereof.

Historically, copies of document originals have been produced by a xerographic process wherein the document original to be copied is placed on a transparent platen, either by hand or automatically through the use of a document handler, and the document original illuminated by a relatively high intensity light. Image rays reflected from the illuminated document original are focused by a suitable optical system onto a previously charged photoconductor, the image light rays functioning to discharge the photoconductor in accordance with the image content of the original to produce a latent electrostatic image of the original on the photoconductor. The latent electrostatic image so produced is thereafter developed by a suitable developer material commonly referred to as toner, and the developed image transferred to a sheet of copy paper brought forward by a suitable feeder. The transferred image is thereafter fixed as by fusing to provide a permanent copy while the photoconductor is cleaned of residual developer preparatory to recharging.

More recently, interest has arisen in electronic imaging where in contrast to the aforedescribed xerographic system, the image of the document original is converted to electrical signals or pixels and these signals, which may be processed, transmitted over long distances, and/or stored, are used to produce one or more copies. Certain similarities, however, exist between electronic systems and xerographic systems, one of which involves the need for an optical system to focus the image rays reflected from the document original onto the image reading array which serves to convert the image rays to electrical signals. While discrete optical image array systems are known to the art, it would be advantageous in terms of economy and simplification if an integrated reading array/optical system chip could be provided.

Further, it would also be advantageous if the normally separate document reading and copy printing operations could be combined. Presently, reading of the document original employs certain components such as a document feeder, document scanner, etc., which are normally separate structures from certain equivalent copy printing components. However, these copy printing components perform essentially the same function, that is, feeding a document which in this case is a sheet of copy paper, scanning which in this case comprises scanning a printing array, etc. If some of these reading/writing functions could be combined, system operation and synchronization could be simplified and system cost reduced through the use of fewer parts.

The invention relates to a monolithic full width image read bar for scanning documents comprising the combination of: an elongated substrate; a plurality of photodetectors arranged to form at least one array; a like plurality of lenses in optical relation with the photodetectors, the number of lenses equalling the number of photodetectors, and circuit means for processing image signals output by the photodetectors.

The invention further relates to a reading/writing system including a monolithic image read bar having at least one array of reading elements and optical means associated with each reading element for focusing the reading element onto the document line being read, the image read bar reading a document image line by line at a read/write station; an image write bar for writing copies of the document read by the read bar at the read/write station; the number in configuration of the writing elements of the image write bar being identical to the number and configuration of the reading elements of the image read bar; means for operating the image read and write bars in unison to substantially simultaneously read the document and print copies thereof; and means for simultaneously feeding in back to back relation the document to be read and the copy sheet to the read/write station to permit reading of the document by the read bar while the print bar writes a copy of the document image on the copy sheet.

IN THE DRAWINGS

Figure 1:
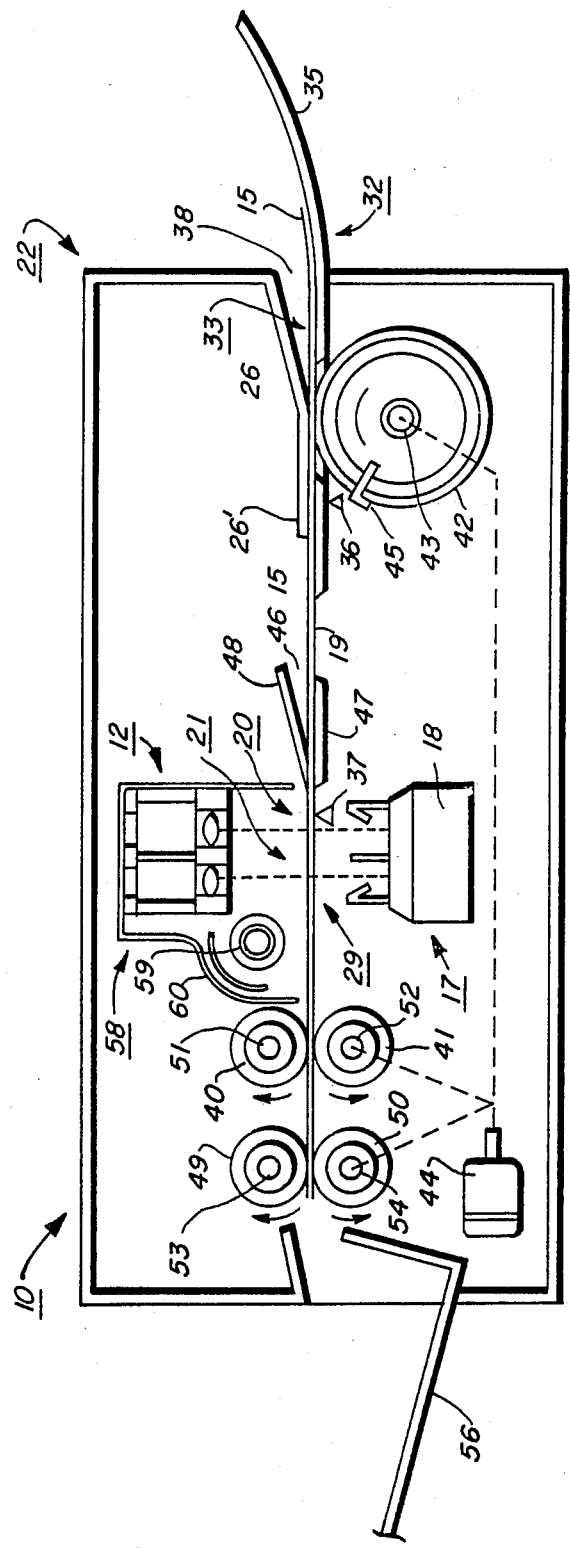
FIG. 1 is a side view with cover removed of the combined raster input and raster output scanner of the present invention.
Figure 2:
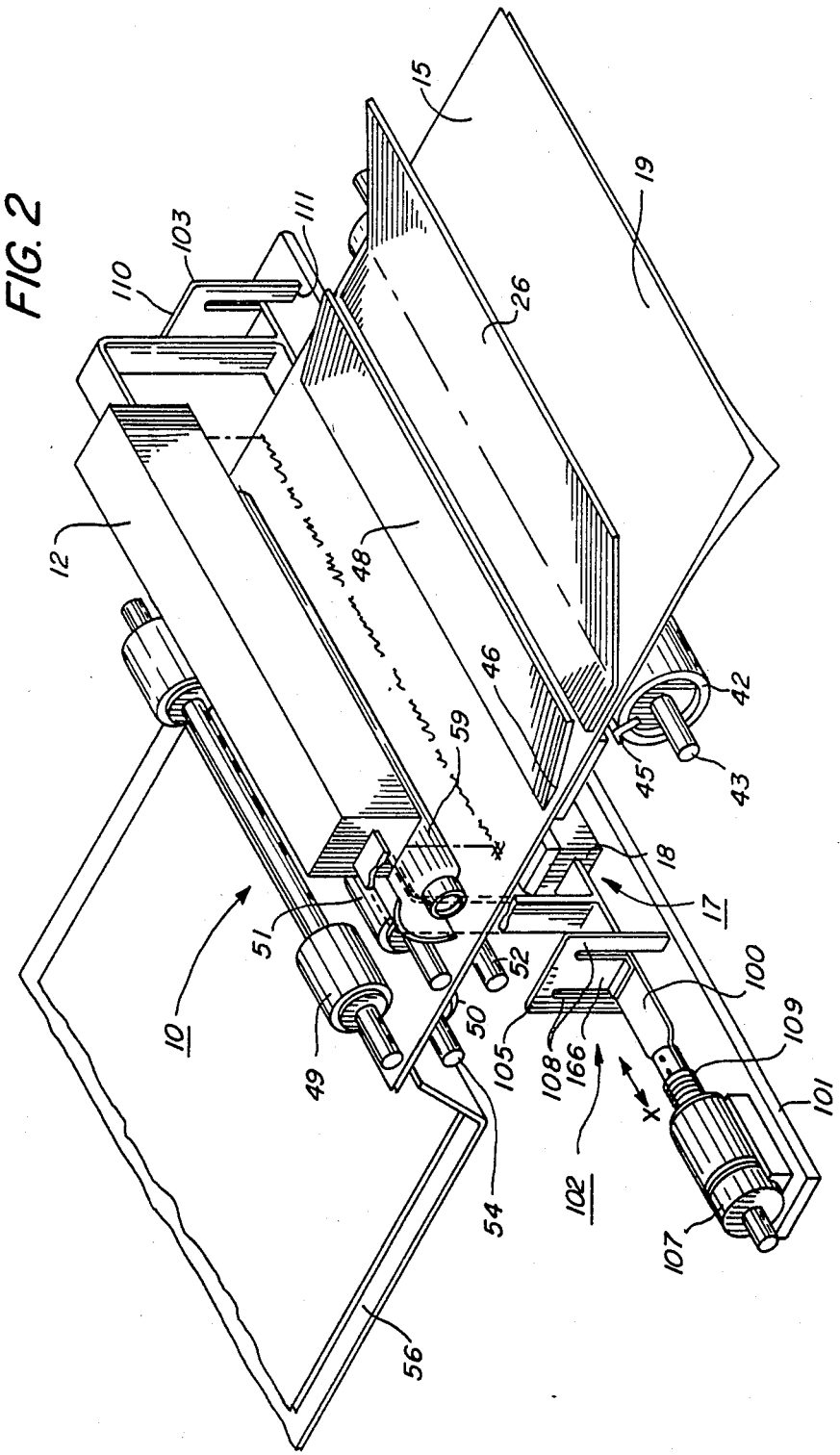
FIG. 2 is an isometric view of the scanner shown in FIG. 1.

Referring to FIGS. 1 and 2 of the drawings, there is shown a combined raster input scanner and raster output scanner, designated generally by the numeral 10, of the present invention. For raster input scanning, an image read bar 12 scans or reads document originals 15 at read/write station 29, the document image areas scanned being converted to electrical image signals or pixels. While the image signals so produced may be output to a suitable user such as a memory, communication channel, printer, and the like, in a preferred operational mode of scanner 10 (R/W MODE), the image signals generated by read bar 12 are input to the print bar 18 of ink jet type printer 17 which serves to produce, i.e. write copies of the document original 15 in accordance with the image signals on a suitable copy substrate such as copy sheet or paper 19, such copying being done substantially simultaneously with reading the document original 15.

As will be understood, the number of scanning elements or sensors that comprise image read bar 12 determine the initial scanning resolution while the number of ink jet nozzles that comprise print bar 18 determines resolution of the image copy. In a preferred arrangement, the number and arrangement of the sensors of image read bar 12 matches the number and location of the ink jet nozzles of print bar 18. A large number of sensors and ink jet nozzles may be provided to enhance resolution. Alternately, to reduce cost and complexity, a relatively small number of sensors and ink jet nozzles (for example 88) may be employed. Whatever the sensor and ink jet density, both image read bar 12 and print bar 18 are oscillated harmonically in a direction (i.e. the X direction) substantially normal to the direction of document and copy sheet movement to enhance resolution.

Scanner 10 includes a suitable frame or housing 22 within which image read bar 12 and print bar 18 are disposed in opposed spaced relation at a read/write station 29. An input support or tray 32 for both document original 15 and copy sheet 19, which are scanned concurrently with document original 15 on top and copy sheet 19 on the bottom (the combined document original and copy sheet are identified hereinafter by the numeral 33), is operatively coupled to housing 22 at one end thereof, tray 32 preferably comprising an upwardly curved plate-like member 35 fixedly attached to scanner housing 22 by suitable means (not shown). An upper guide 26 cooperates with tray 32 to form a slit-like inlet 38 for receipt of the combined original/copy sheet 33. A suitable sheet detector 36 is provided at the inlet 38 to detect insertion of the combined document/copy sheet 33. In the embodiment shown, the combined document/copy sheet 33 is inserted into inlet 38 by hand although automatic feeding means may be contemplated for this purpose.

A feed roller 42 is provided downstream of inlet 38, the outer periphery of roller 42 cooperating with end 26' of guide 26 to form a nip for advancing the combined original/copy sheet 33 forward to read/write station 29. Feed roller 42 is carried on a shaft 43 rotatably supported in document housing 22. Shaft 43 is drivingly coupled by suitable means (not shown) to a suitable drive motor such as step motor 44. A registration stop 45 is provided on feed roller 42 to locate or register the combined document/copy sheet 33 on introduction thereof into inlet 38. A retard slit 46 formed by spaced lower plate 47 and upper guide 48 is provided in housing 22 downstream of feed roller 42 and upstream of read/write station 29. Retard slit 46, through which the combined document/copy sheet 33 passes, serves in cooperation with the pinch roll pairs 40, 41 and 49, 50 to tension the combined document/copy sheet as will appear.

Discharge pinch roll pairs 40, 41 and 49, 50 are disposed downstream of read/write station 29, pinch rolls 40, 41 and 49, 50 being carried by shafts 51, 52, 53, 54 respectively. Shafts 51, 52, 53, 54, are rotatably supported in housing 22 by suitable bearing means (not shown). As will be understood, pinch roll pairs 40, 41 and 49, 50 cooperate to form nips between which the combined original/copy sheet 33, following reading and writing thereof at read/write station 29, is fed. To enable the combined document/copy sheet 33 to be tensioned, particularly for printing purposes, pinch roll pairs 40, 41 and 49, 50 are coupled to step motor 44 by suitable speed increasing coupling means (not shown) designed to rotate pinch roll pairs 40, 41 and 49, 50 at a speed slightly in excess of the speed of feed rollers 42. Additionally, side edge supports (not shown) may be provided to further support the combined document/copy sheet 33 as will be understood by those skilled in the art. A suitable sheet detector 37 is provided at read/write station 29 to detect arrival of the combined document/copy sheet 33.

An output tray 56 is disposed on the downstream side of pinch roll pair 49, 50 to receive the combined original/copy sheet 33 discharged by pinch roll pair 49, 50, the level of output tray 56 preferably being below the nip formed by pinch roll pair 49, 50 to facilitate passage of the combined original/copy sheet 33 therein. Following depositing of the combined document/copy sheet 33 in tray 56, document original 15 and copy sheet 19 are separated as for example by hand.

To illuminate the document lines being scanned at read/write station 29, a suitable high intensity light source illustrated herein as elongated lamp 59, is provided in housing 58 of read bar 12. Reflector 60 serves to concentrate the light rays emitted by lamp 59 onto the document at read/write station 29.

Figure 3:
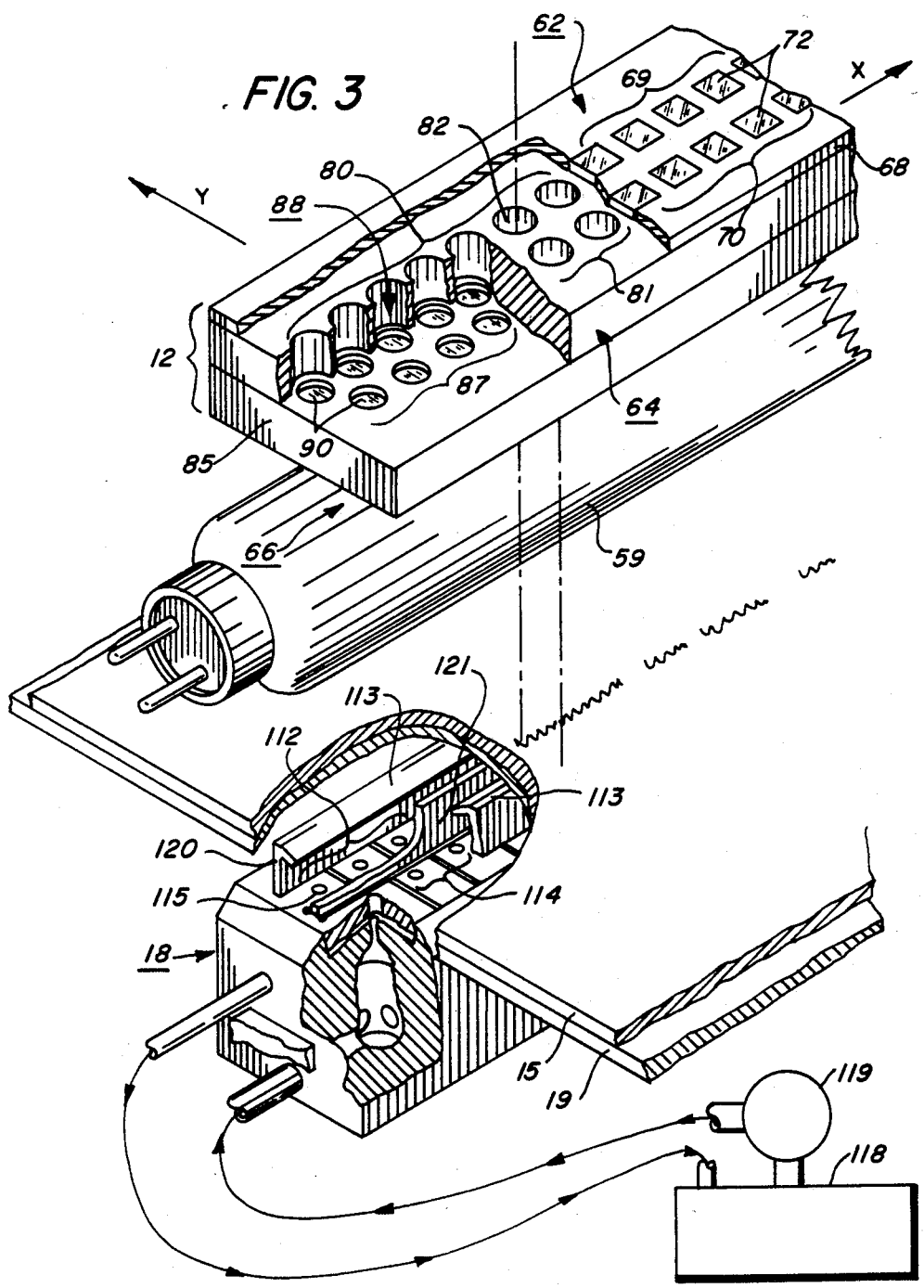
FIG. 3 is an isometric view showing details of the read and write bars of the present invention.

Referring particularly to FIG. 3, read bar 12 consists of a sandwich structure formed from a sensor block 62, and intermediate aperture block 64, and a lens block 66 joined together to form a unitary bar. The longitudinal dimension of bar 12 is preferably made sufficient to enable read bar 12 to effectively span the width of the document original to be read.

Sensor block 62 comprises a suitable substrate or base 68 such as silicon having parallel rows 69, 70 of photodiode elements or sensors 72 which may be formed using thin film technology thereon. To enhance the packing density of sensors 72 (and as it will be understood of the ink jet nozzles of print bar 18), the centerline of the sensors 72 of row 69 may be offset from the centerline of the sensors of row 70 in the cross scan direction (the Y direction shown by the arrow). The image signal handling and processing circuitry is preferably integrated onto base 68. As described, the number and disposition of sensors 72 on base 68 is determinative of image scan resolution, and in the embodiment shown a relatively few number of sensors 72 with relatively wide separation between the sensors themselves (i.e. along the scan or X direction) and the sensor rows 69, 70 (along the Y direction) is provided. In one example, the diameter of sensors 72 may be 50 mils with separation of approximately 1.5 mils between adjoining sensors and an offset of 1.5 mils between centerlines of the sensors 72 of row 69 relative to the sensors 72 of row 70.

Aperture block 64 which is formed of any suitable material impervious to light such as epoxy, has rows 80, 81 of individual viewing apertures 82 therethrough, the number of viewing apertures 82 and the disposition thereof being the same as that of sensors 72. The dimension of viewing apertures 82 may be equal to the size of sensors 72 and preferably slightly larger.

Lens block 66 comprises a unitary molded lens plate 85 of optical quality polycarbonate or equivalent material formed to provide two rows 87, 88 of lenses 90, the number and disposition of lenses 90 being equal to the number and disposition of sensors 72 and the cooperating viewing apertures 82. The diameter of lenses 90 is sufficient to permit lenses 90 to collect light from the individual imaging areas viewed and focus the image rays onto the sensor 72 associated therewith through the associated viewing aperture 82, it being understood that the thickness of aperture block 64 is chosen to provide an optical path of the requisite length.

Print bar 18 comprises plural rows 112, 114 of ink jet nozzles 115 to which ink is supplied under pressure by pump 119 from a suitable manifold reservoir 118. Preferably the number and disposition of ink jet nozzles 115 and ink jet rows 112, 114 is identical to that of sensors 72 of read bar 12. Print bar 18 may be of the electrostatic type wherein the individual streams of ink droplets emitted by nozzles 115 are selectively charged in accordance with image signals output by read bar 12 by charge plates 120, 121, therebeing one pair of plates 120, 121 for each ink jet nozzle. Where charged, the droplets are deflected from a normal course onto copy paper 19.

Where not charged, the ink droplets are collected by gutter 113 for return to reservoir 118.

Both image read bar 12 and print bar 18 are suitably supported such that sensor row 69 and ink jet nozzle row 112 process one line while the second sensor row 70 and ink jet nozzle row 114 process a second line. Read bar 12 and print bar 18 have controlled harmonic movement in a direction substantially normal (i.e. the X direction) to the direction (i.e. the Y direction) of movement of the combined original/copy sheet 33. For this purpose, read bar 12 and print bar 18 are jointly supported by means of a mounting plate 100 (seen in FIG. 2) in predetermined spaced relation to the plane of movement of the combined document/copy sheet 33 through read/write station 29. Plate 100 is in turn supported on base section 101 of frame 22, plate 100 together with read bar 12 and print bar 18 being reciprocated back and forth through a preset distance or stroke in the X direction.

To provide the aforementioned reciprocating movement of plate 100, a harmonic support comprised of flexure mounts 102, 103 are used to support plate 100 on base section 101. Each flexure mount 102, 103 cormprises a substantially upright spring element 105 having a depending center finger 106 secured to plate 100 flanked by depending side fingers 108 fixedly attached to base section 101. Flexure mounts 102, 103 are preferably relatively wide to minimize any sideways motion of plate 100 and the read and print bars 12, 18 respectively supported therefrom. Since plate 100 can pivot about the top edge 100 of flexure mounts 102, 103 while the top edge 110 can in turn pivot about the line 111 of contact between base section 101 and side fingers 108, a double pivoting action is achieved which maintains read bar 12 and print bar 18 in desired spatial relationship with the combined document/copy sheet 33 at read/write station 29.

A suitable drive such as solenoid 107 is drivingly coupled to plate 100 to move plate 100 and the read and write bars 12, 18 respectively carried thereby through a preset distance or stroke along the X axis. Suitable return means such as spring 109, which may be disposed internally of solenoid 107, is provided to return plate 100 to the initial read/write position following deenergization of solenoid 107.

Figure 4:
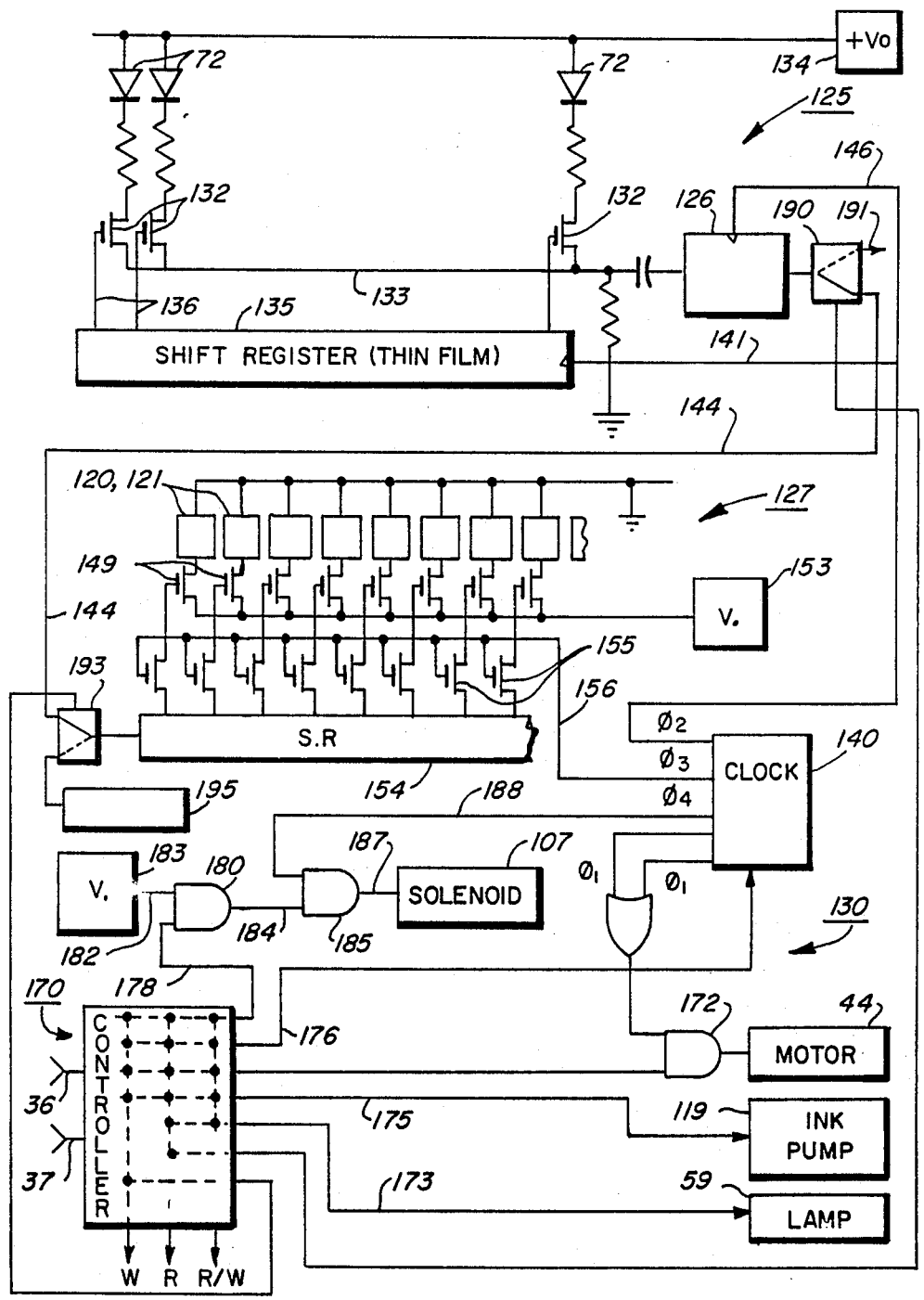
FIG. 4 is a logic schematic of the operating control for the scanner shown in FIG. 1.

Referring to FIG. 4 the control system for scanner 10 includes read bar operating circuit 125, print image processing circuit 126, ink jet operating circuit 127, and overall system control circuit 130. Read bar operating circuit 125, which is preferably integrated onto read bar base 68, includes a read control gate 132 for coupling each sensor 72 across voltage source 134 and image signal output line 133. Control gates 132 are energized in succession to provide a serial stream of image signals to output line 133, a shift register 135 having successive output stages thereof coupled by lines 136 to the control terminals of gates 132 being provided for this purpose. Clock pulses $\phi_2$ for operating shift register 135 are derived from system clock 140 through clock line 141.

Image signal processing circuit 126 comprises any suitable signal processing circuit or circuits and may for example include circuits for amplifying the signal output of sensors 72, DC restoration, thresholding the image signals, etc., as will be understood by those skilled in the art. Following processing, the image signals are fed through image signal output gate 190 to line 144 and ink jet operating circuit 127 and/or to output line 191 and the remote user (not shown). Signal processing circuit 126 is driven in synchronism with read bar operating circuit 125 by clock pulses $\phi_2$ input through clock line 146.

Ink jet operating circuit 127 includes a succession of print control gates 149 for selectively coupling the individual electrostatic deflector plate pairs 120, 121 associated with each ink jet nozzle 115 with a suitable source of voltage 153. A distributing shift register 154 has successive output stages coupled by gates 155 to the control electrode of gates 149. The control electrodes of gates 155 are coupled by clock line 156 to the $\phi_3$ clock pulse output terminal of clock 140. The output of image processing circuit 126 is coupled by line 144 through image signal input gate 193 to the loading terminal of shift register 154. As will appear, image signal input gate 193 permits input of image signals to print bar 18 either from read bar 12 or other image signal source 195.

System control circuit 130 includes a suitable system controller 170 for operating scanner 10 in either a read/write mode (R/W MODE) or read only mode (R MODE) or write only mode (W MODE), controller 170 controlling enabling of step motor 44 through gate 172, and lamp 59, ink jet pump 119, and clock 140 through lines 173, 175, 176 respectively. Controller 170 initially controls through gate 180 enabling of solenoid 107, the output of controller 170 being coupled to gate 180 through line 178. The other input of gate 180 is coupled through line 182 to a suitable solenoid power source 183. The output of gate 180 is coupled by line 184 to one input of solenoid control gate 185, the output of which is coupled by line 187 to solenoid 107. The second input of gate 185 is coupled by clock line 188 to the $\phi_4$ clock pulse terminal of clock 140.

Clock 140 provides relatively high frequency and relatively lower frequency clock pulses $\phi_1'$ and $\phi_1$, respectively to gate 172 for operating step motor 44 at a relatively fast stepping rate designed to advance the combined document/copy sheet 33 rapidly to read/write station 29 and, during reading and writing, at a predetermined stepping rate in synchronism with the reading/writing process.

OPERATION

For operation of scanner 10 in the read/write mode, controller 170 is set to the R/W position to ready lamp 59, ink pump 119, clock 140, solenoid 107, and step motor 44 for operation. The operator or user mates the document 15 to be scanned with a copy sheet 19, with the document on top and the image to be copied facing upwardly. The combined document/copy sheet 33 is inserted into the nip formed by guide 26 and feed roller 42, the leading edge of the combined document/copy sheet abutting against registration stop 45 of roller 42.

Insertion of the combined document/copy sheet 33 into inlet 38 is detected by sensor 36 and controller 170 actuates clock 140 to output relatively high frequency clock pulses $\phi_1'$ to motor 44 to step the combined document/copy sheet 33 forward through the slit 46 formed by plate 47 to read/write station 29 at a relatively fast rate. There, in response to a signal from sensor 37, controller 170 switches clock 140 to the relatively lower frequency clock pulse rate $\phi_1$ while actuating lamp 59 and ink pump 119. Actuation of lamp 59 illuminates the document area being scanned while actuation of pump 119 supplies ink under pressure to ink jet nozzles 115 of print bar 18. The streams of ink emitted by nozzles 115, in the absence of any energizing voltage applied to deflector plates 120, 121, are collected by gutters 113.

Figure 5:
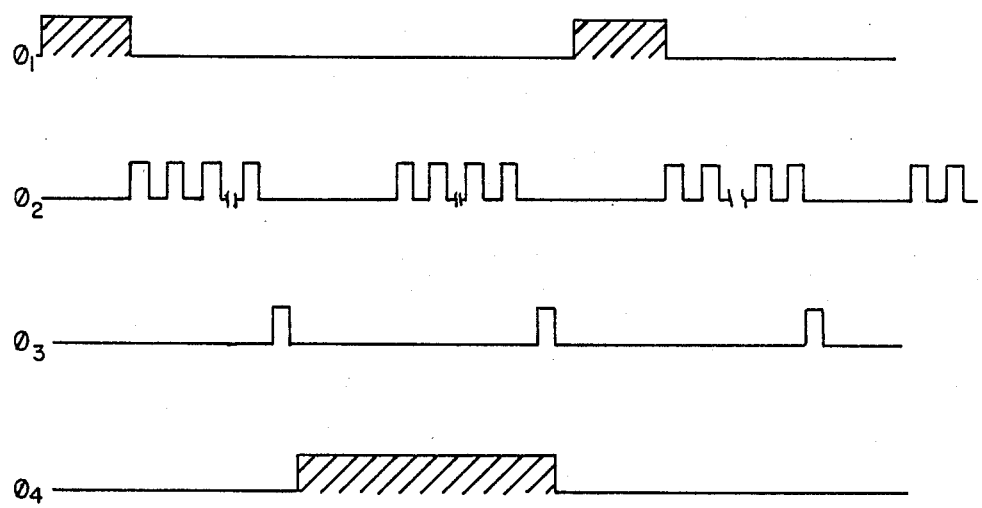
FIG. 5 is a timing chart illustrating the operational sequence of the scanner shown in FIG. 1.
Figure 6:
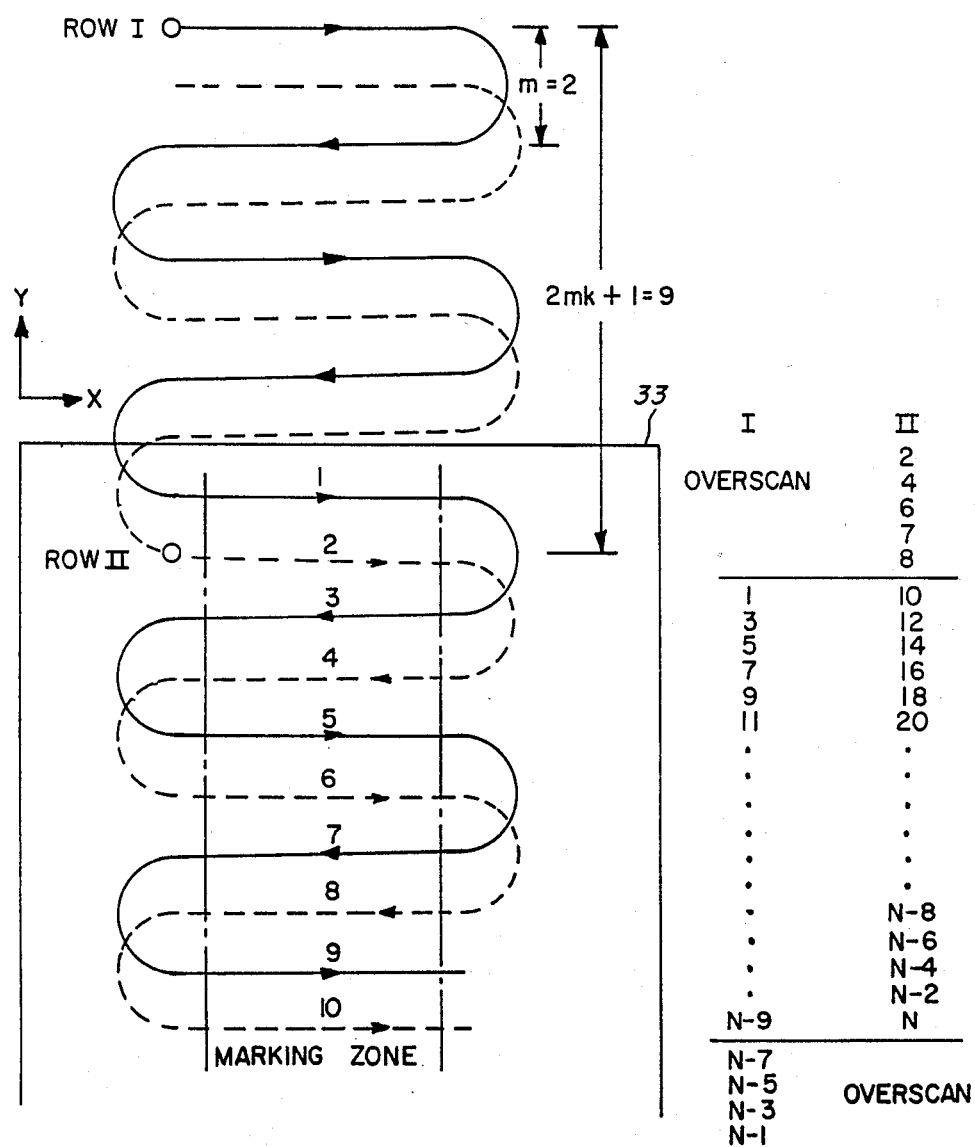
FIG. 6 is a diagram illustrating scan line coverage and overscan in a typical embodiment.

In the exemplary arrangement shown, a spacing of 10 lines is presumed between sensor rows 69, 70 and between ink jet rows 112, 114. Inasmuch as dual rows 69, 70 and 112, 114 of sensors 72 and ink jet nozzles 115 are provided, step motor 44 is arranged to step the combined document/copy sheet 33 two lines at a time. Referring particularly to FIGS. 5 and 6 of the drawings, the clock pulse output $\phi_1$ of clock 140 momentarily energizes step motor 44 to turn feed roll 42 and pinch roll pairs 40, 41 and 49, 50 and step the combined document/copy sheet 33 forward two lines to bring the second line (L2) of the combined document/copy sheet 33 opposite sensor row 70 and ink jet nozzle row 114. In the example shown, it is understood that the combined document/copy sheet 33 has not reached sensor row 69 and ink jet nozzle row 112 at this time.

On clock pulses $\phi_2$, sensor read control gates 132 are actuated in succession by enabling signals output by successive stages of shift register 135 to sample the arrays of sensors 72 of image read bar 12. The resulting serial image signal output passes through image processing circuit 126, switch 190, line 144 and switch 193 to shift register 154 of print circuit 127.

Image processing circuit 126 processes the image signal output of read bar 12 in a suitable manner to provide a stream of binary image signals which are loaded through successive stages of shift register 154. Following sampling of the last sensor 72 of read bar 12 and loading of the last image signal into shift register 154, clock pulse $\phi_3$ from clock 140 triggers gates 155 for a predetermined interval to couple the output stages of shift register 154 to ink jet print control gates 149. Where the image signal in the shift register stage associated therewith is relatively high (for example a binary 1), the print control gate 149 is triggered to couple voltage source 153 across the deflector plate pair 120, 121 coupled thereto. The resulting electrostatic force deflects the ink jet passing between so that the ink jet strikes the copy paper line opposite thereto. Where the image signal in the shift register stage is relatively low (for example a binary 0), the print control gate 149 controlled thereby remains in an unactuated state and the deflector plate pair associated therewith are not energized. Accordingly the jet of ink passing therebetween remains undeflected and is collected by gutter 113.

Following the predetermined printing interval, clock pulse $\phi_4$ energizes solenoid 104 to displace read bar 12 and print bar 18 to the second read/write position, movement of read bar 12 and print bar 18 being substantially normal to the direction of feed of the combined document/copy sheet 33 along the X direction. As a result, sensors 72 in row 70 and ink jet nozzles 115 in row 114 are disposed in position to read and write the in-between portions of the second line (i.e. line L2). The aforedescribed read/write process is repeated to complete reading and writing of the second line (line L2). Due to the spacing (in this example, 10 lines) between the rows 69, 70 of sensors 72 and rows 112, 114 of ink jet nozzles 115, the upstream sensor and ink jet rows 69, 12 respectively are beyond the combined document/copy sheet 33 and hence do not scan or record any images.

Following completion of the read/print process, solenoid 104 is deenergized to permit the combined read and print bars 12, 18, under the influence of spring 109, to return to the first read/write position and clock pulse $\phi_1$ energizes step motor 44 to step the combined document/copy sheet 33 forward two lines. As a result, the fourth line (line L4) of the combined document/copy sheet 33 is disposed opposite sensor and ink jet nozzle rows 70, 114 respectively. The aforedescribed two stage read/write process is repeated to read and write the fourth line (line L4). Again, it is understood that sensor and ink jet nozzle rows 69, 112 respectively are beyond the combined document/copy sheet 33 and therefore do not scan or record any images.

With completion of the read/write cycle, clock pulse $\phi_1$ energizes step motor 44 to step the combined document/copy sheet 33 forward another two lines to bring the sixth line (i.e. line L6) opposite sensor and ink jet nozzle rows 70, 114 respectively, whereat the sixth line is read and written in the manner described. On the next step cycle, the eighth line (i.e. line L8) of the combined document/copy sheet 33 is processed. The next cycle of step motor 44 brings the first line (line L1) and tenth line (line L10) opposite sensor and ink jet nozzle rows 69, 112 and 70, 114 respectively. On clock pulses $\phi_2$ and $\phi_3$, both lines L1 and L10 are processed, line L1 by sensor and ink jet nozzle rows 69 and 112 respectively and line L10 by sensor and ink jet nozzle rows 70 and 114 respectively. Following the predetermined printing interval, clock pulse $\phi_4$ triggers solenoid 104 to displace read bar 12 and print bar 18 to the second read/write position to permit reading and writing of lines L1 and L10 to be completed in the manner described heretofore.

On the next read/write cycle, the combined document/copy sheet 33 is stepped another two lines to process lines L3 and L12, following which the next pair of lines are processed, and so forth and so on until the entire document/copy sheet 33 has been processed.

It will be understood that as the trailing edge of the combined document/copy sheet 33 reaches the reading/writing area, the sensor and ink jet nozzle rows 70, 114 are no longer in operative position and hence cease to process the combined document/copy sheet 33. Sensor and ink jet rows 69, 112 respectively, however, continue to process the remaining lines of the combined document/copy sheet until the trailing edge has passed thereby.

Where it is desired to operate scanner 10 in a document read mode only, controller 170 is set to the R position. In that setting, controller 170 readies lamp 59, clock 140, solenoid 107, and step motor 44 for operation. At the same time, the signal from controller 170 actuates image signal output gate 190 to route the image signal output of processing circuit 126 to output line 191. The document 15 to be scanned is manually inserted into the inlet 38.

On a demand for image signals from the remote user which may for example comprise a memory, communication channel, printer, or the like, clock 140 is actuated and the clock pulses $\phi_1$ therefrom energize motor 44 to operate feed roller 42 at a relatively high stepping rate to bring the document leading edge forward to read/write station 29. On detection of the document leading edge by sensor 37, controller 170 switches the clock output to pulses $\phi_1$. As a result, step motor 44 drives feed roller 42 and pinch roll pairs 40, 41 and 49, 50 at the relatively slower stepping rate to step the document through read/write station 29 and past read bar 12 two lines at a time. Read bar 12 operates in the manner described heretofore, sensors 72 of read bar 12, on clock pulse $\phi_2$ being sampled and the image signals produced, following processing by signal processing circuit 126, passing to output line 191 through gate 190. Following completion of the scan cycle, solenoid 107 is energized on clock signal $\phi_4$ to displace read bar 12 to the second read/write position. On clock pulses $\phi_2$, sensors 72 are again sampled to complete reading of the remainder of the line or lines being read the image signals passed to output line 191. Solenoid 107 is thereafter deenergized to return read bar 12 to the first read/write position and on the next clock signal $\phi_1$, the document is stepped forward another two lines and the process repeated. The foregoing is repeated until the entire document has been read.

Similarly, where printing only is desired, controller 170 is set to the W position, signals from controller 170 readies ink pump 119, clock 140, solenoid 107, and step motor 44 for operation. Image signal input gate 193 is actuated, gate 193 coupled the load terminal of shift register 154 to a suitable source of image signals exemplified herein as memory 195. It is understood that the image signals in memory 195 have been previously segregated into partial line segments, each partial line being comprised of alternate image signals. The copy sheet 19 to be processed is inserted into inlet 38.

As described, the copy sheet is advanced at a relatively rapid rate by feed roller 42 to read/write station 29 following which step motor 44 is operated at a relatively slow rate to step the copy sheet forward two lines at a time. At each step cycle, on clock pulses $\phi_2$, the first partial lines of image signals in buffer 195 are clocked into shift register 154 of ink jet operating circuit 127. Following loading of the image signals into shift register 154, the clock pulse $\phi_3$ from clock 140 actuates print gates 155 to deflect selective ones of the ink jets emitted by nozzles 115 in accordance with the image signal content to print the partial lines onto the copy sheet 19.

On clock pulse $\phi_4$ solenoid 104 is energized to displace print bar 18 to the second read/write position. Clock pulses $\phi_2$ load the remainder of the line into shift register 154 and on clock signal $\phi_3$, the print gates 155 are selectively actuated to cause ink jet nozzles 115 to print the remainder of the two images lines. Solenoid 107 is then deenergized and on the next clock pulse $\phi_1$, step motor 44 is actuated to step the copy sheet 19 forward two lines and the above described process repeated. The foregoing process continues until the entire copy image has been processed.

It will be understood that in both the aforedescribed read only and write only modes, the document 15 or copy sheet 19 being processed in each of these modes is initially read or written by one sensor or ink jet nozzle row 70, 114 respectively pending movement of the document or copy sheet forward to a point where both sensor or ink jet nozzle rows are in operative disposition with the document or copy sheet being processed. Similarly, as the trailing edge of the document or copy sheet being processed passes from read/write station 29, processing is only effected by sensor row 69 or ink jet nozzle row 114.

While the invention has been described in the context of an exemplary 10 line space between adjoining sensor and ink jet nozzle rows 69, 70 and 112, 114 respectively, other spatial relationships between the sensor and ink jet nozzle rows may instead be contemplated.

While the invention has been described with reference to the structure disclosed, it is not confined to the details set forth, but is intended to cover such modifications or changes as may come within the scope of the following claims.

I claim:

1. A unitary part for images comprising in combination:
   (a) a first section composed of a substrate having a plurality of image sensors integral therewith which form at least one scanning array;
   (b) a second section spaced from said first section, said second section being composed of a substrate having a plurality of individual lenses integral therewith for focusing image rays from the image being scanned onto said sensors, there being one lens associated with each of said sensors; and
   (c) a third section intermediate said first and second sections for placing said first and second sections in predetermined spaced operative juxtaposition with one another, said third section being composed of a substrate of light impervious material in face to face contact with said first and second sections and having a plurality of apertures therein, there being one aperture associated with each of said sensors and lenses for optically coupling each of said lenses with the sensor associated therewith in fixed prealigned relation with one another, the centerlines of each of said image sensors being coaxial with the centerline of the lens and aperture associated therewith; said first, second, and third sections together forming a pre-aligned unitary part for scanning images.

2. The unitary part according to claim 1 in which said sensors are arranged in two parallel scanning arrays, the centerlines of the sensors of one array being offset relative to the centerlines of the sensors of the other array, said lenses of said second section being disposed in two parallel arrays with the centerlines of the lenses of one lens array being offset relative to the centerlines of the lenses of the other lens array in matching relation with the sensors of said first section;

said apertures of said third section being disposed in two parallel arrays with the centerlines of the apertures in one aperture array being offset relative to the centerlines of the apertures of the other aperture array in matching relation with the centerlines of the sensors of said first section and the centerlines of the lenses of said second section.

3. The unitary part according to claim 1 in which said first, second and third sections cooperate to form a generally rectangular part for scanning images, the axis of said scanning array being parallel to the longitudinal axes of said part.

* * * * *